(12) United States Patent
Engelhardt et al.

(10) Patent No.: US 6,398,670 B1
(45) Date of Patent: Jun. 4, 2002

(54) GOLF TRAINING AND GAME SYSTEM

(75) Inventors: Lennart Engelhardt, Ingarö; Magnus Dahl, Upplands Väsby; Nils Dahl, Bro, all of (SE)

(73) Assignee: Xolf, Inc., Portland, OR (US)

( * ) Notice: Subject to any disclaimer, the term of this patent is extended or adjusted under 35 U.S.C. 154(b) by 0 days.

(21) Appl. No.: 09/578,565

(22) Filed: May 25, 2000

(51) Int. Cl.$^7$ .............................................. A63B 71/06
(52) U.S. Cl. ................... 473/407; 473/131; 473/409; 473/406; 348/207; 348/211
(58) Field of Search ............................... 473/131, 407, 473/409, 406; 348/207, 211

(56) References Cited

U.S. PATENT DOCUMENTS 5,364,093 A * 11/1994 Huston et al. ................. 273/32
5,873,797 A * 2/1999 Garn ........................... 473/407

FOREIGN PATENT DOCUMENTS

| EP | 0625716 | 11/1994 |
|----|---------|---------|
| GB | 2318300 | 4/1998 |
| JP | 8-112387 | * 5/1996 |

* cited by examiner

*Primary Examiner*—Valencia Martin-Wallace
*Assistant Examiner*—Carmen D. White
(74) *Attorney, Agent, or Firm*—Ostrolenk, Faber, Gerb & Soffen, LLP

(57) ABSTRACT

A golf training and game system is situated in a golf playing facility with tee and target areas. At each target area an overview video camera captures an image of the target area when a golf ball is hit from a tee. A target measuring system performs image improvement methods on the captured image, detects possible balls, and calculates coarse real coordinates for the possible balls. A memory stores real coordinates for previously-identified balls. Coordinates for possible balls and identified balls are compared to determine new balls to be identified. New ball coordinates are used to position, zoom and focus a zoom video camera and capture a fine image. The target measuring system performs image improvement methods and pattern recognition on the fine image to identify the new balls and get fine real coordinates. Information sent to a tee terminal gives feedback to the players.

16 Claims, 5 Drawing Sheets

GOLF TRAINING AND GAME SYSTEM

TECHNICAL FIELD OF THE INVENTION

The present invention relates in a first aspect to a golf training and game system, which gives the player/players immediate feedback.

In a second aspect the present invention relates to a golf training and game method which gives the player/players immediate feedback.

In a third aspect the present invention relates to at least one computer program product for golf training and golf game which gives the player/players immediate feedback.

DESCRIPTION OF RELATED ART

When golf players today are trying to improve their skills in playing golf it is very customary to make use of a driving range. You pay for e.g. a bucket of balls and start training by hitting ball after ball. One problem with this "training method" is that it is not possible to get accurate feedback regarding the precision. This means that this "training method" not can be considered to be accurate and effective.

The patent document GB-B-2, 318, 300 discloses a golf playing game including an electronic surveillance camera and a motion sensor mounted above and focused on a target area. The image data generated by the camera and the data generated by the motion sensor is transmitted to a central processing unit. The image of the target area transmitted by the surveillance camera is displayed on the screen of a video monitor. Movement of an object on the target area is detected by the motion sensor and displayed on the monitor screen The central processing unit includes a library of target area overlays to alter the viewed characteristics of the target area on the monitor screen. Each target area may include a marker surrounded by a spaced apart scoring ring or rings so that a ball lying on the target area can, if it lies within a predetermined area, be allocated a score.

One drawback with this solution is that it is not possible to get accurate feedback regarding the precision. Another significant drawback is that it is not possible to identify each ball, and one can not be sure from whom a ball comes. Another drawback is that it is also hard to know which ball is the last ball if the ball hits another ball or is bouncing. In that case it will be hard to follow the ball with the motion detector. Yet another drawback is that the target area is very limited, probably about 4–8 $m^2$ or 5×7 $m^2$ according to the fact that only one video camera is use at about 7 meters height. Furthermore, the described ball tracking system is not designed to measure a high number of ball hits in several target areas. It can only keep track of one ball at a time and will not be able to identify many balls from many players.

The patent document EP-A2-0 625 716 discloses a portable system for monitoring the initial flight of a sport object, e.g. a golf ball. The system includes at least one shutterable camera unit and each of which units receive light patterns from each and every one of a plurality of contrasting areas on the object in rapid successive sequence. A computer receives the signals generated by the light patterns as received by each camera unit to determine the objects' flight characteristics. The system also comprises two flash lamps adjacent to each camera unit. This system is useful for calculating the speed and spin of a golf ball and can be used as a useful practice aid and data-gathering apparatus for equipment design.

The main drawback with this system is that it is not possible to use it as a golf training and game system.

SUMMARY

It is an object of the present invention to solve the above mentioned problems.

According to the present invention there is provided in a first aspect a golf training and game system which gives the player/players immediate feedback. The golf training and game system is situated in a golf playing area comprising at least one tee area, and at least one target area. The system also comprises at each target area at least one overview video camera, and at least one zoom video camera. The system also comprises a target measuring system connected to said at least one overview camera and to said at least one zoom video camera. Said at least one overview video camera captures an image covering at least said target area when a golf ball being hit at said tee area, wherein said target measuring system performs image enhancement methods on said captured image and detects possible balls in said captured image. Said target measuring system also calculates coarse real coordinates for said possible balls. The golf training and game system also comprises a memory means connected to said target measuring system, which memory means is operable to store real coordinates for already identified balls. Said target measuring system comprises a comparing device operable to compare said coarse real coordinates for said possible balls with said real coordinates for already identified balls to determine new ball(s) to be identified. Said coarse real coordinates for said new ball(s) are used to position, zoom and focus said at least one zoom video camera on said new balls(s) to capture a fine image on said new ball(s). Said target-measuring system performs image enhancement methods and pattern recognition on said fine image to identify said new balls(s) and gets their fine real coordinates. Information regarding said coordinates are sent to at least one tee terminal positioned at said at least one tee area, which tee terminal is operable to give feedback to said player/players. The main advantage with the system according to the present invention is that it gives one or several player(s) immediate feedback on their precision when training golf playing. With this system it is also possible to train golf more accurate and effective.

Preferably said golf training and game system also comprises a video switch device connected between said target measuring system and said cameras, and a control device connected between said target measuring system and said at least one zoom and focus of said at least one zoom video camera.

Advantageously, said memory means is a database and in that said target measuring system updates said database with real coordinates for said new Preferably, different golf balls are having different colors and/or unique marks or patterns.

Advantageously, said golf training and game system also comprises at least one registration video camera at said tee area operable to register the hit of a golf ball.

Preferably, each tee terminal comprises a display device operable to display the position(s) of the ball(s) at said target area.

Advantageously, said golf training and game system also comprises a back-office device connected to said target measuring system, which back-office device is operable to via the Internet be connectable to another golf training system situated at another place.

Preferably, said target measuring system is a PC-system.

Advantageously, each said at least one overview video camera and each said at least one zoom video camera is a video CCD-camera.

Another object of the present invention is to provide a golf training and game method, which gives the player/players immediate feedback. Said method is performed in a golf playing area comprising at least one tee area and at least one target area. The method comprising the following steps:

- to capture at least one image covering at least said at least one target area with at least one overview video camera when a golf ball being hit at said tee area;
- to perform image enhancement on said at least one captured image, and to detect possible golf balls in said at least one captured image;
- to calculate coarse real coordinates for said possible golf balls;
- to compare said coarse real coordinates for said possible balls with real coordinates for already identified balls to determine new ball(s) to be identified;
- to use said coarse real coordinates for said new ball(s) to position, zoom and focus at least one zoom video camera on said new ball(s);
- to capture at least one fine image on said new ball(s) with said at least one zoom video camera;
- to perform image enhancement and pattern recognition on said at least one fine image to identify said new ball(s) and get their fine real coordinates; and:
- to send information regarding said coordinates to at least one tee terminal positioned at said at least one tee area, which tee terminal is operable to give feedback to said player/players.

The main advantage with these methods according to the present invention is that it gives one or several player/players immediate feedback on their precision when training golf playing. With this method it is also possible to train golf more accurate and effective.

Preferably, said method also comprises the step:
- to start the method by an installation and calibration process to get a calibration matrix and geometry data.

Advantageously, said method also comprises the steps:
- to use said calibration matrix and geometry data to calculate and match all said possible golf balls; and
- to create one big single target area and a data collection of said possible golf balls and said coarse real coordinates.

Preferably, said method also comprises the steps:
- after the step of getting said fine real coordinates, to determine occurrence of unexpected ball movement(s) by checking if an earlier ball is missing or if a new ball is identified as an earlier ball;
- if unexpected ball movement is determined to update old ball with new position, whereby said moved ball will have an original position in the form of said fine real coordinates, and a new actual position in the form of new fine real coordinates; and
- to update a memory means, operable to store real coordinates for already identified balls, with new real coordinates for new ball(s), and new actual positions for moved old ball(s).

Advantageously, said method also comprises the step:
- to register and identify a hit of a golf ball with at least one registration video camera.

Preferably, said golf balls are identified by the fact that different golf balls are having different colors and/or unique marks or patterns.

Advantageously, said method can be used at different places with the aid of the Internet.

Another object of the present invention is to provide at least one computer program product directly loadable into the internal memory of at least one digital computer. The at least one computer program product comprises software code portions for performing the steps of the method according to the present invention, when said at least one product is/are run on at least one computer. The main advantage with the computer program product(s) according to the present invention is that it/they gives one or several player(s) immediate feedback on their precision when training golf playing.

It should be emphasized that the term "comprises/comprising" when used in this specification is taken to specify the presence of stated feature, steps or components but does not preclude the presence of one or more other features, integers, steps components or groups thereof.

Embodiments of the invention will now be described with a reference to the accompanying drawings, in which:

DETAILED DESCRIPTION OF EMBODIMENTS

Figure 1:
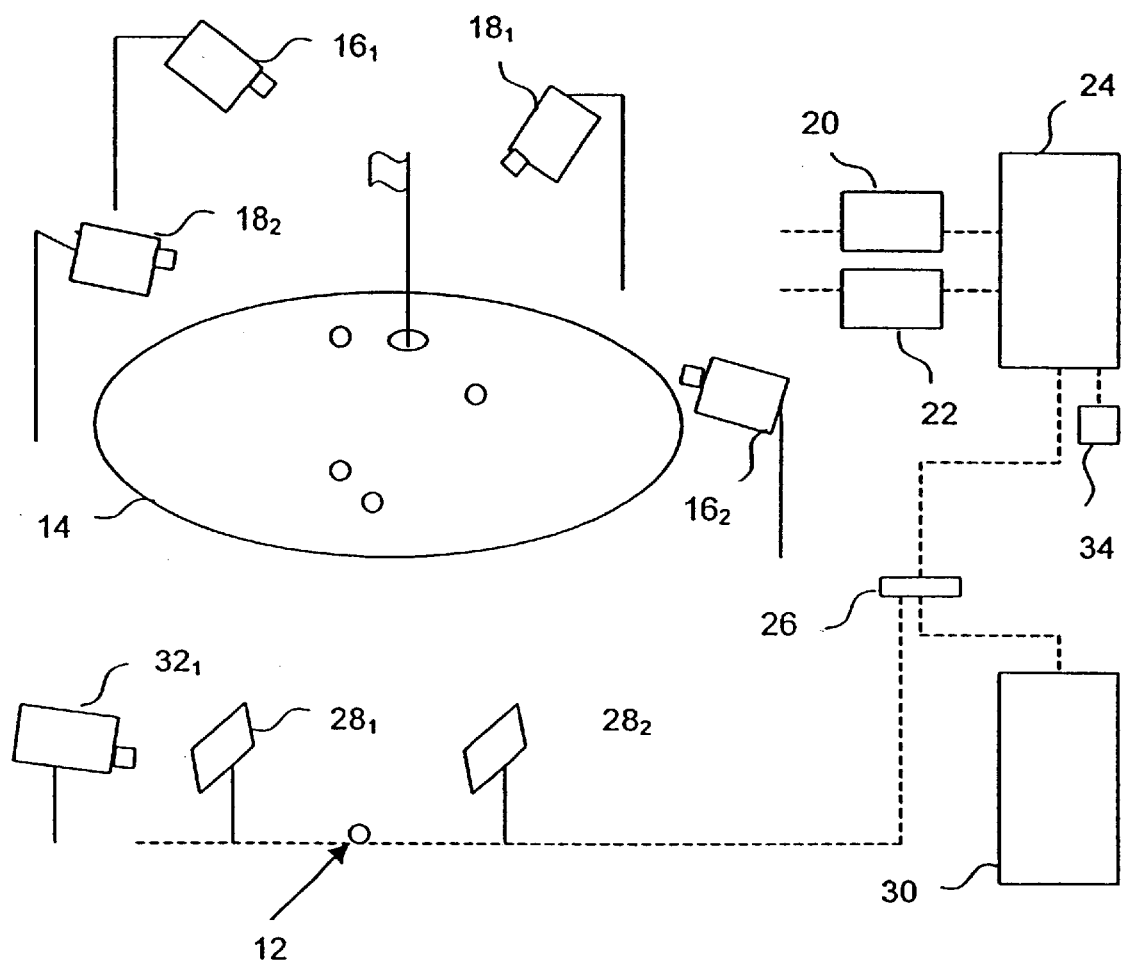
FIG. 1 shows a block diagram of a golf training system according to the present invention.

In FIG. 1 there is disclosed a block diagram of a golf training and game system 10 according to the present invention. The golf training and game system 10 is situated in a golf playing area, e.g. a driving range comprising at least one tee area 12, and at least one target area 14. For sake of simplicity there is only disclosed one tee area 12 and one target area 14 in FIG. 1. The system 10 comprises at each target area 14 at least one overview video camera $16_1, \ldots, 16_n$, and at least one zoom video camera $18_1, \ldots, 18_m$. For sake of simplicity there is only disclosed two overview video cameras $16_1, 16_2$ and two zoom video cameras $18_1, 18_2$ in FIG. 1. The golf training and game system 10 also comprises a video switch device 20 connected to all said video cameras $16_1, 16_2, 18_1, 18_2$, and a control device 22 connected to the two zoom video cameras $18_1, 18_2$. The golf training and game system 10 also comprises a target measuring system 24 connected to the video switch device 20 and to the control device 22. The target measuring system 24 is connected to a network 26, which in turn is connected to at least one tee terminal $28_1, \ldots, 28_p$. For sake of simplicity there is only disclosed two tee terminals $28_1, 28_2$ in FIG. 1. The network 26 is also connected to a back-office device 30 operable to, via the Internet, be connectable to another golf training system 10 situated at another place. The golf training and game system 10 may optionally comprise at least one registration video camera $32_1, \ldots, 32_q$ at said tee area 12 operable to register the hit of a golf ball and identify the ball. This is an advantageous feature if there are many duplicate balls (e.g. balls with the same pattern. See FIG. 3.). For sake of simplicity there is only disclosed one registration video camera $32_1$ in FIG. 1. The golf training and game system 10 also comprises a memory means 34 connected to said target measuring system 24, which memory means 34 is operable to store real coordinates for already identified balls. The memory means 34 can e.g. be in the form of a data base 34. The purpose with the network 26 (e.g. a Local Area Network) is to transfer data from each target area 14 to the memory means 34 which keeps track of the entire game with one or several target areas and that also can be connected to the internet. Each tee terminal $28_1$, $28_2$ comprises a display device (not shown) operable to display the position(s) of the ball(s) at said target area 14. The target measuring system 24 can e.g. be a PC-system 24. Each said overview video camera $16_1$, $16_2$ and each said zoom video camera $18_1$, $18_2$ can e.g. be a video CCD-camera. It is also necessary, to let different golf balls having different colors and/or unique marks or patterns. See FIG. 3. This makes it easier to distinguish between different golf balls.

Now follows a description of the function of the golf training and game system 10 disclosed in FIG. 1. Envision that your are at a driving range equipped with such a golf training and game system 10. You can get your bucket of e.g. colored golf balls by swiping your Target Golf™ membership card. You walk over to the tee area 12 and view the target areas 14 in front of you at different distances away. By simply touching the screen on the tee terminal, e.g. $28_1$, you tell the system 10 what target you want to shoot at. Target areas 14 can also be selected by the system 10 at random. You have chosen a target area 14, you are being focused on the task and you hit the ball. The two overview video cameras $16_1$, $16_2$ capture at least one image each to cover at least said target area 14. These images are transferred to the target measuring system 24 via the video switch device 10 in such a way that said images are received by the target measuring system 24 one at a time. The target measuring system 24 then performs image enhancement on said captured images and detects possible balls in said captured images. The target measuring system 24 then performs movement detection to see if a ball still is moving to be able to capture at least one image on said ball when it is not moving any longer. Thereafter, the target measuring system 24 calculates coarse real coordinates for said possible balls. A comparing device (not shown) in the target measuring system 24 then compares said coarse real coordinates for said possible balls with said real coordinates for already identified balls to determine new ball(s) to be identified. The real coordinates for already identified balls are retrieved from the memory means 34. The coarse real coordinates for said new ball(s) are sent to the control device 22 which chooses the appropriate zoom video camera in dependence of said coarse real coordinates. When this choice have been made, the control device 22 sends control signals to e.g. the zoom video camera $18_1$. These control signals control the position, the zoom and the focus of said zoom video camera $18_1$. Said zoom video camera $18_1$ are then used to capture a fine image on said new ball(s). This fine image is then transferred to the target measuring system 24 which performs image enhancement and pattern recognition on said fine image to identify said new ball(s) and get their fine real coordinates. Information about said fine coordinates are inter alia sent to the memory means 34, e.g. a data base system (game server) which calculates scores and coordinate measurements from several target areas 14 and associates it with the right player and tee area 12 and then sends it to the right tee terminal $28_1$. This feedback can e.g. be in the form of an image displayed on the screen of the tee terminal $28_1$, see e.g. FIG. 7.

As an example, 1–4 players per tee will play the game. The system will give different alternatives of games. Come closest to flag, get highest score of the day/week/month, play against a global ranking list or against another player somewhere else in the world. As an example each player gets 15 balls and can play against one or several targets. The closer the flag the higher score. The winner is the one who gets the highest total. There can also be closest to flag this day/week/month. Players might chose a sequence of different distances (targets) that make the game more challenging. In one mode players can let the system select target at random. There can be several games going on at the same time from different tees, which requires that the system can handle balls from more than one game and players coming into one target. The game will measure each ball, determine which tee, player and game it belongs to before giving the right score to the actual player.

Following this game description we can summarize the following important and unique features of the system that makes it possible to play the unique game and use the unique training device:

1. To detect a ball hit in the target area without missing it or by mistake replace with a false ball or by another ball. This is made possible by using one or several overview cameras in combination with keeping a record (database) of all earlier balls.

2. Detecting the identity of the ball by analyzing the last ball hit using a specialized zoom-camera looking at the ball's color and/or unique marks or patterns in combination with doing analysis of data collected from previous balls. This will also avoid the possible mistake to replace the ball with another.

3. With high precision determine the position of each ball by combining overview cameras and zoom cameras and also using calibration and geometric data from installation. That is background/surface image data and also measured fixed points (a physical coordinate system placed on the target area with fixed known points that is recorded by all zoom and overview cameras and then stored in the database as geometric and calibration data).

4. Managing a larger target area without losing precision by using a combination of one of several overview cameras and one or several zoom-cameras. The overview camera(s) will detect every new ball hit. The zoom camera(s) will verify the actual ball hit by analyzing the unique marks, pattern and color(s) of the ball and then comparing it with already collected data.

5. Managing unexpected ball movements like one ball hitting another ball by using the systems ability to keep track of the total history of the play and the possibility to identify every unique ball.

6. Managing unexpected balls coming from another game or player not belonging to the game or training session using the features mentioned above.

7. The specialized pattern to be printed on the golf ball will make it possible to safely identify a great number of unique balls. The example with 7 spots in 2×3 colors will allow 279.936 unique balls. The ball also contains calibration information (RGB, known colors) that makes the measurement stable and accurate.

Figure 2:
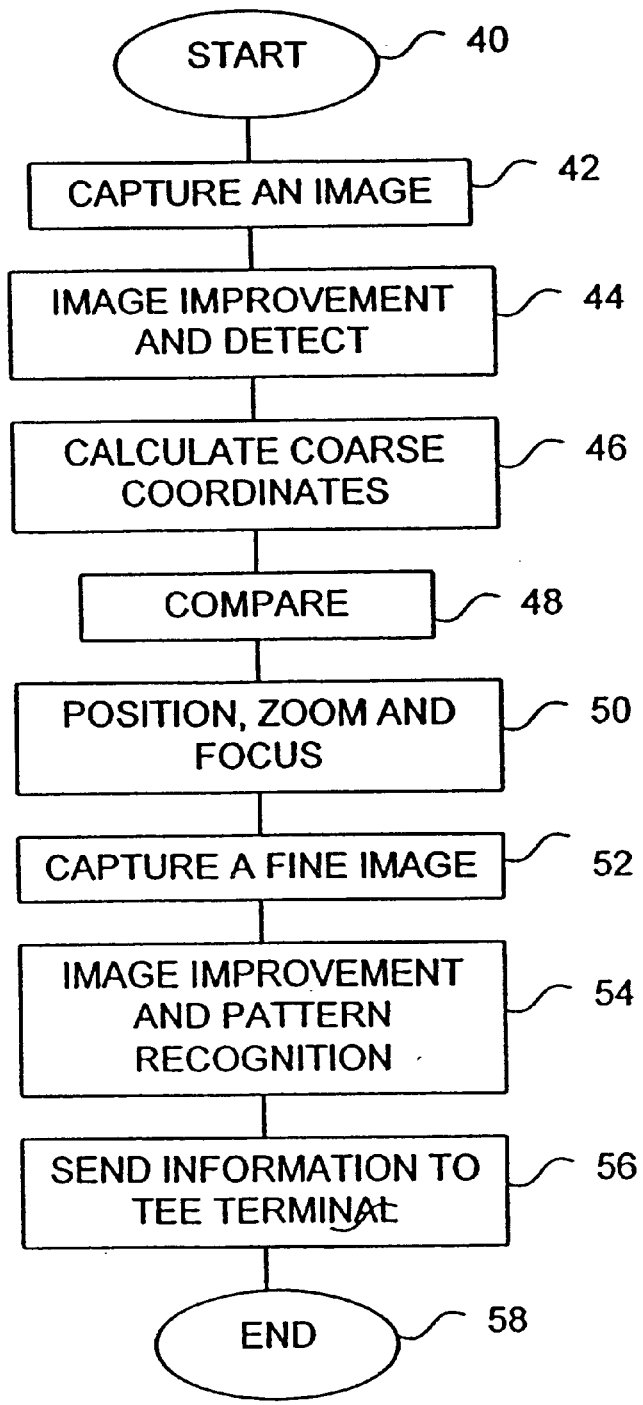
FIG. 2 is a flow chart of a golf training method according to the present invention.

In FIG. 2 there is disclosed a flow chart of a golf training and game method according to the present invention. The method begins at block 40. The method is performed in a golf playing area comprising at least one tee area and at least one target area (see FIG. 1). At block 42 the method continues with the step: to capture at least one image covering at least said at least one target area with at least one overview video camera when a golf ball being hit at said tee area. The activation of the overview video camera can be triggered either manually by pushing a touch screen (tee terminal) or by the target measuring system performing capture of an image regularly, i.e. every two seconds and looking for movements. The method continues at block 44 with the step: to perform image enhancement on said at least one captured image, and to detect possible golf balls in said at least one captured image. The next step, at block 46, consists of calculation coarse real coordinates for said possible golf balls. The method continues at block 48 with the step: to compare said coarse real coordinates for said possible balls with real coordinates for already identified balls to determine new ball(s) to be identified. The next step, at block 50, consists of using said coarse real coordinates for said new ball(s) to position, zoom and focus at least one zoom video camera on said new ball(s). The method continues at block 52 with the step: to capture at least one fine image on said new ball(s) with said at least one zoom video camera. The next step, at block 54, consists of performing image enhancement and pattern recognition on said at least one fine image to identify said new ball(s) and get their fine real coordinates. The method continues at block 56 with the step: to send information regarding said coordinates to at least one tee terminal positioned at said least one tee area, which tee terminal is operable to give feedback to said player/players. The method is completed at block 58.

The method according to the present invention can also comprise the step: to start the method by an installation and calibration process to get a calibration matrix and geometry data. The method makes it possible with high precision to determine the position of each ball by combining overview cameras and zoom cameras and also using calibration and geometric data from installation. That is background/surface image data and also measured fixed points (a physical coordinate system place on the target area with fixed known points that is recorded by all zoom and overview cameras and then stored in the data base as geometric and calibration data. The calibration matrix can then be used to calculate and match all said possible golf balls. Then the method can continue by creating one big single target area and a data collection of said possible golf balls and said coarse real coordinates. After the step 56 (see FIG. 2) the method can also comprise the steps: to determine occurrence of unexpected ball movement(s) by checking if an earlier ball is missing or if a new ball is identified as an earlier ball. If unexpected ball movement is determined there is performed updating of old ball with new position, whereby said moved ball will have an original position in the form of said fine real coordinates, and a new actual position in the form of new fine real coordinates. Thereafter the method continues with the step: to update a memory means, operable to store real coordinates for already identified balls, with new real coordinates for new ball(s), and new actual positions for moved old ball(s). According to one embodiment of the method, said method can start with the step: to register a hit of a golf ball and identify said ball with at least one registration video camera. In accordance with another preferred embodiment of said method the golf balls are identified by the fact that different golf balls are having different colors and/or unique marks or patterns. Another advantage with this method is that it can be used at different places with the aid of the Internet. This makes it possible for two different golf players to use this method and play against each other at different places, e.g. in Paris and in Stockholm.

Figure 3:
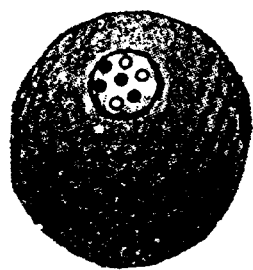
FIG. 3 shows a schematic picture of a golf ball provided with a unique pattern according to the present invention.

In FIG. 3 there is disclosed a schematic picture of a golf ball provided with a unique pattern according to the present invention. The disclosed pattern is in the form of 7 spots encircled by a circle. The spots can e.g. have different colors. The more different colors will give rise to the more unique combinations. Using 4 different colors for balls with 7 spots, as disclosed in FIG. 3, will give rise to 2,097,152 possible unique balls.

Figure 4:
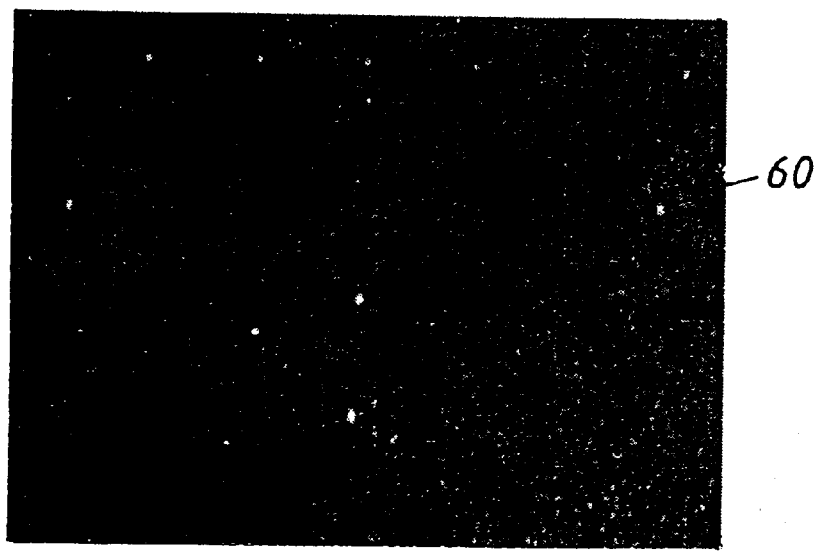
FIG. 4 shows an original image captured directly from the overview video camera.

In FIG. 4 there is disclosed an original image captured directly from an overview video camera (see FIG. 1). In this figure there is disclosed 11 possible golf balls, e.g. at 60, in the form of white spots.

Figure 5:
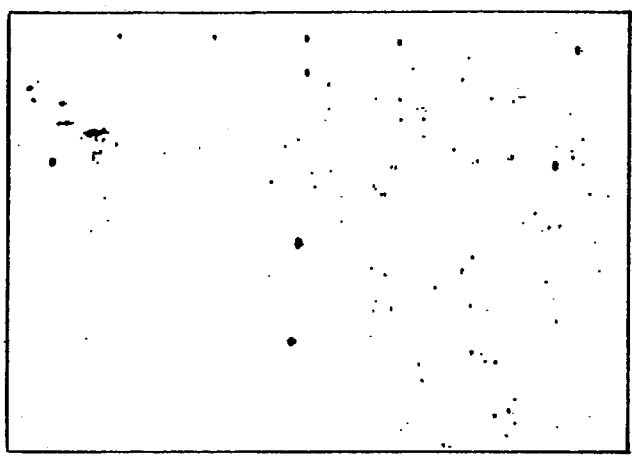
FIG. 5 show the result of detecting golf balls from the image disclosed in FIG. 3, when using traditional image processing methods.

In FIG. 5 there is disclosed the result of detecting the possible golf balls disclosed in FIG. 4, when using traditional image processing methods. An example of a traditional image processing method is using a standard noise reduction filter like smoth followed by a fixed binary thresholding. As can be seen in this figure there is a lot of "noise" which can be interpreted as possible balls.

Figure 6:
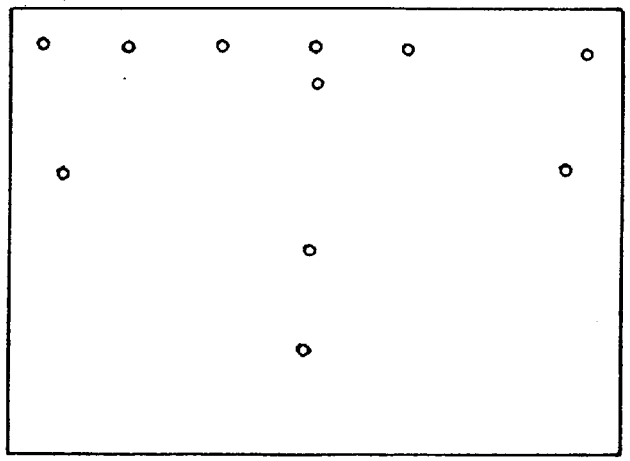
FIG. 6 shows the result of detecting golf balls from the image disclosed in FIG. 3, when using image improvement methods and dynamic thresholding followed by object analysis.

In FIG. 6 there is disclosed the result of detecting the possible golf balls disclosed in FIG. 4, when using image improvement methods and dynamic thresholding followed by object analysis in accordance with the present invention. The dynamic thresholding is performed by calculating a filter and a threshold for each local part of the image, optimizing the contrast around each ball individually As can be seen in this figure the eleven possible golf balls are clearly distinguishable and no "noise" is occurring.

Figure 7:
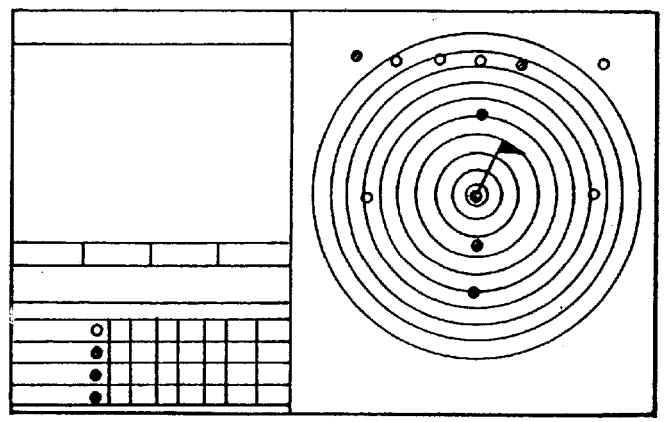
FIG. 7 shows an example of a display image displayed on a screen of a tee terminal.

In FIG. 7 there is disclosed an example of a display image displayed on a screen of a tee terminal. This is one example of the feedback given to a player. The player can now see how the 11 golf balls are situated at the target area.

Figure 8:
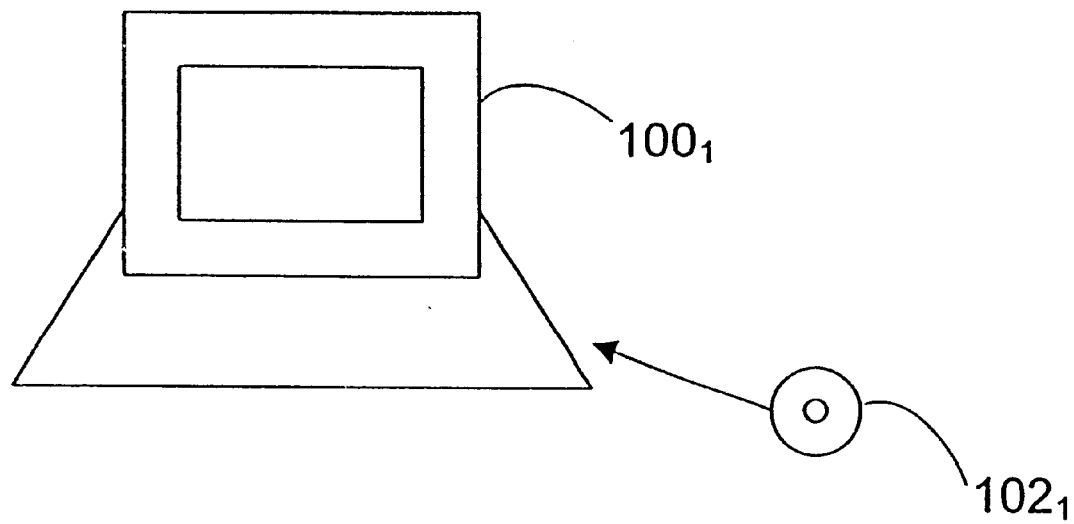
FIG. 8 shows a schematic diagram of some computer program products according to the present invention.
Figure 8:
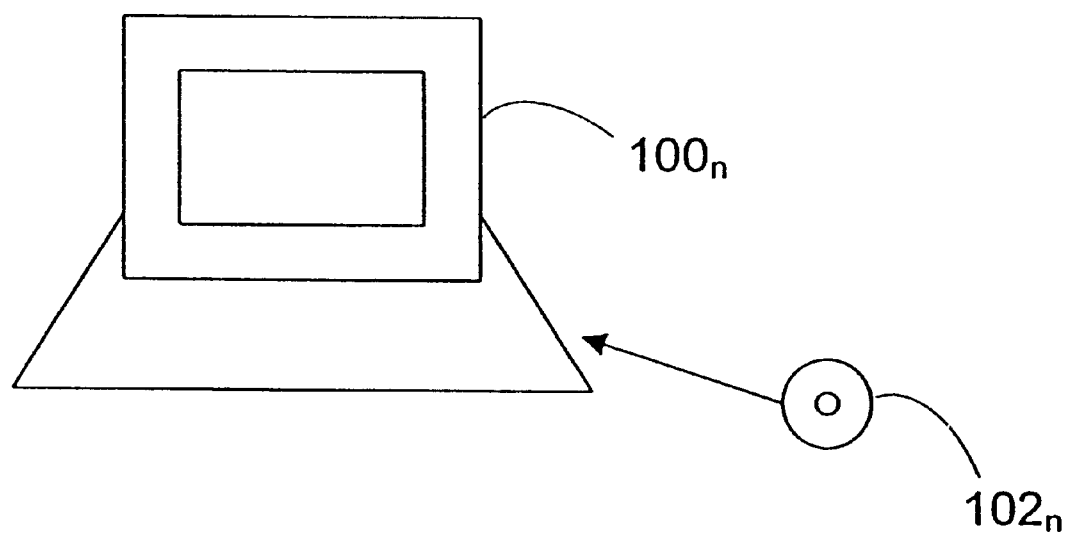

In FIG. 8 there is disclosed a schematic diagram of some computer program products according to the present invention. There is disclosed n different digital computers $100_1, \ldots, 100_n$ wherein n is an integer. There is also disclosed n different computer program products $102_1, \ldots, 102_n$ here showed in the form of compact discs. The different computer program products $102_1, \ldots, 102_n$ are directly loadable into the internal memory of the different digital computers $100_1, \ldots, 100_n$. Each computer program product $102_1, \ldots, 102_n$ comprises software code portions for performing some or all the steps of FIG. 2 when the product(s) $102_1, \ldots, 102_n$ is/are run on said computer(s) $100_1, \ldots, 100_n$. Said computer program products $102_1, \ldots, 102_n$ can e.g. be in the form of floppy discs. RAM-discs, magnetic tapes, opto magnetical discs or any other suitable products.

The invention is not limited to the embodiments described in the foregoing. It will be obvious that many different modifications are possible within the scope of the following claims.

What is claimed is:

1. A golf and game system which gives a player immediate feedback, wherein said golf and game system is situated in a golf playing area comprising at least one tee area, and at least one target area, said system comprises:

at each target area at least one overview video camera for capturing an image as a captured image covering at least said target area when a golf ball is being hit at said tee area, and at least one zoom video camera, a target measuring system connected to said at least one overview video camera and to said at least one zoom video camera, wherein said target measuring system is operable to perform image improvement methods on said captured image and to detect possible balls in said captured image, and said target measuring system is further operable to calculate coarse real coordinates for said possible balls, memory means connected to said target measuring system said memory means is operable to store real coordinates for already identified balls, said target measuring system comprises a comparing device operable to compare said coarse real coordinates for said possible balls with said real coordinates for already identified balls to determine new ball(s) to be identified, said target measuring system being operable to use said coarse real coordinates for said new ball(s) to position, zoom and focus said at least one zoom video camera on said new ball(s) for said zoom video camera to capture a fine image on said new ball(s), said target measuring system being operable to perform image improvement methods and pattern recognition on said fine image to identify said new ball(s) and get their fine real coordinates, at least one tee terminal positioned at said at least one tee area, said target measuring system being operable to send information regarding said coordiltes to said at least one tee terminal which is operable to give feedback to said player(s).

2. A golf training and game system according to claim 1, further comprising a video switch device connected between said target measuring system and said cameras, and a control device connected between said target measuring system and said at least one zoom video camera, said control device being operable to control the zoom and focus of said at least one zoom video camera.

3. A golf training and game system according to claim 2, wherein said memory means is a data base and said target measuring system is operable to update said data base with real coordinates for said new ball(s).

4. A golf training and game system according to claim 3, further comprising different golf balls having different colors and/or unique marks or patterns, for being hit at said tee area.

5. A golf training and game system according to claim 2, further comprising at least one registration video camera at said tee area and operable to register and identify the hit of a golf ball.

6. A golf training and game system according to claim 5, wherein each said tee terminal comprises a display device operable to display the position(s) of the ball(s) at said target area.

7. A golf training and game system according to claim 6, further comprising a back-office device connected to said target measuring system, said back-office device being operable to connect said system to another golf training and game system situated in another place.

8. A golf training and game system according to claim 7, wherein said target measuring system is a PC-system.

9. A golf training and game system according to claim 8, wherein each said at least one overview video camera and each said at least one zoom video camera is a video CCD-camera.

10. A golf training and game method which gives a player/players immediate feedback, wherein said method is performed in a golf playing area comprising at least one tee area and at least one target area, the method comprising the steps:

capturing at least one captured image covering at least said at least one target area with at least one overview camera when a golf ball is being hit at said tee area;

performing image improvement on said at least one captured image, and detecting possible golf balls in said at least one captured image;

calculating coarse real coordinates for said possible golf balls;

comparing said coarse real coordinates for said possible balls with real coordinates for already identified balls to determine new ball(s) to be identified;

using said coarse real coordinates for said new ball(s) to position, zoom and focus at least one zoom video camera on said new ball(s);

capturing at least one fine image on said new ball(s) with said at least one zoom video camera;

performing image improvement and pattern recognition on said at least one fine image to identify said new ball(s) and get their fine real coordinates; and sending information regarding said coordinates to at least one tee terminal positioned at said at least one tee area, and operating said tee terminal to give feedback to said player/players.

11. A golf training and game method according to claim 10, further comprising:

starting the method by an installation and calibration process to get a calibration matrix and geometry data.

12. A golf training and game method according to claim 11, further comprising:

using said calibration matrix and geometry data to calculate and match all said possible golf balls; and creating one big single target area and a data collection of said possible golf balls and said coarse real coordinates.

13. A golf training and game method according to claim 12, further comprising:

after the step of getting said fine real coordinates, determining occurrence of unexpected ball movement(s) by checking if an earlier ball is missing or if a new ball is identified as an earlier ball;

if unexpected ball movement is determined, updating old ball with new position, whereby said moved ball will have an original position in the form of said fine real coordinates, and a new actual position in the form of a new fine real coordinates; and updating a memory, operable to store real coordinates for already identified balls, with new real coordinates for new ball(s), and new actual positions for moved old ball(s).

14. A golf training and game method according to claim 13, further comprising:

registering and identifying a hit of a golf ball with at least one registration video camera.

15. A golf training and game method according to claim 14, further comprising using golf balls identified by different golf balls having different colors and/or unique marks or patterns.

16. A golf training and game method according to claim 15, further comprising performing said method at different places with the aid of the Internet.

\* \* \* \* \*